July 16, 1940.  E. W. CARROLL  2,208,474
FRUIT HANDLING MECHANISM
Filed June 13, 1938  2 Sheets-Sheet 1

INVENTOR,
ELLSWORTH W. CARROLL.
BY
Lippincott + Metcalf
ATTORNEYS.

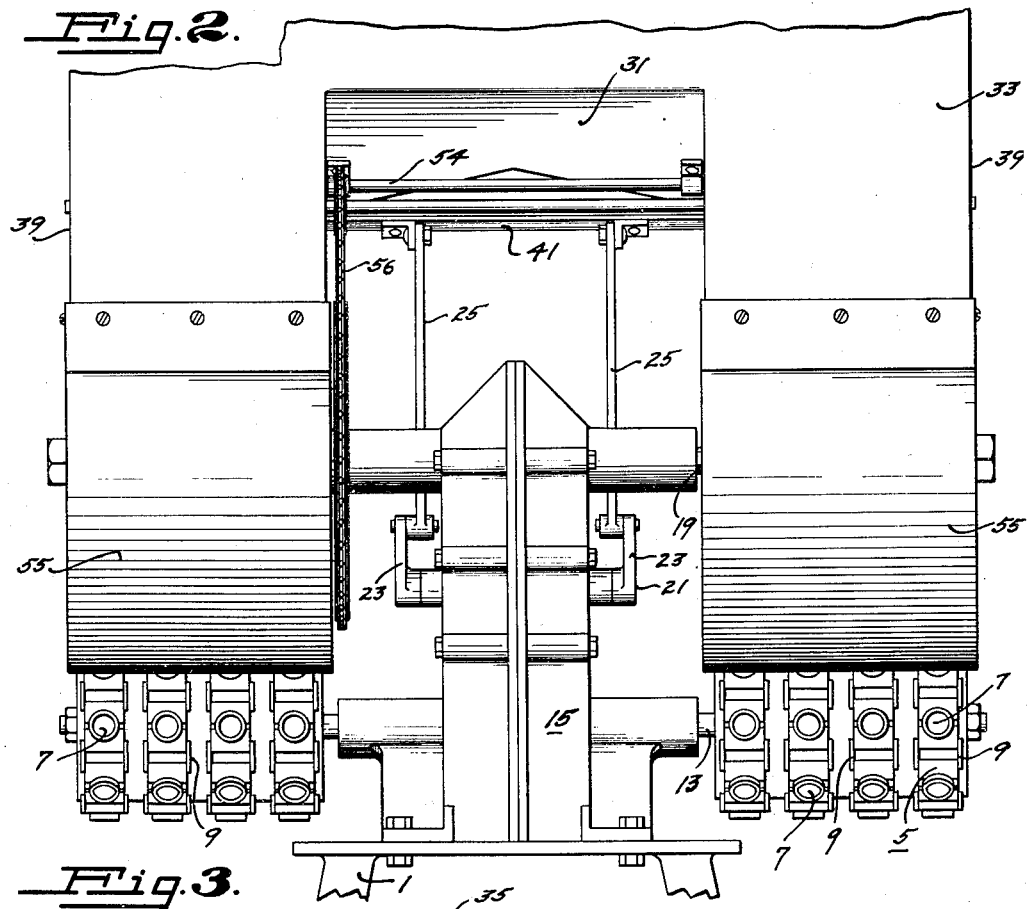
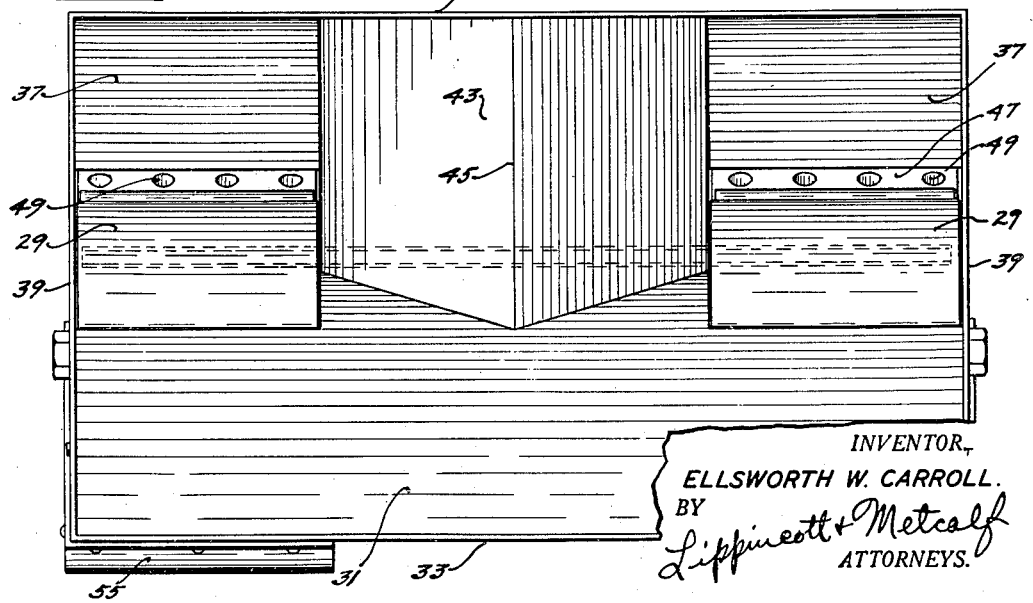

Patented July 16, 1940

2,208,474

UNITED STATES PATENT OFFICE 2,208,474

FRUIT HANDLING MECHANISM

Ellsworth W. Carroll, San Francisco, Calif., assignor to S & W Fine Foods, Inc., San Francisco, Calif., a corporation of California Application June 13, 1938, Serial No. 213,439

12 Claims. (Cl. 198—25)

My invention relates to fruit processing machines and more particularly to that portion of the machine which has to do with the distribution of the fruit in preparation for the processing operations.

The invention to be hereinafter described is an improvement upon distributing means described in my U. S. Patent No. 2,169,353, patented Aug. 15, 1939, and entitled Fruit processing apparatus, and also constitutes an improvement on the apparatus shown in the U. S. Patent of Stephen M. Beede Jr. and James Kilberg, No. 2,186,471, patented Jan. 9, 1940, and entitled Fruit processing apparatus, in both of which cases, the apparatus was described with reference to the processing of cherries. The present invention will likewise be described with respect to apparatus for the handling of cherries, although it is to be understood that the invention is not limited in its application to the processing of this particular fruit.

The process of treating cherries prior to packing or canning for the market includes pitting the fruit to remove the stones. Cherry pitting devices which effectively remove the pits from the cherries without destroying their marketable appearance, have been made the subject of U. S. Patent No. 2,092,956, of September 14, 1937, for Fruit pitter, and U. S. Patent No. 2,169,353 of Aug. 15, 1939, in each of which I appear as an inventor.

While these cherry pitting devices form no part of the instant invention, it will be appreciated, that, in order to permit them to operate satisfactorily and efficiently, it is necessary to deliver individual cherries to each pitting device in orderly fashion, that is, in a properly timed and spaced relationship. For this purpose a driving mechanism is provided which operates the distributing, conveying, and pitting means in synchronism. The conveyor means for carrying the cherries to the pitting devices comprises a number of endless conveyor chains, alternate links of which include fruit carrying means in the form of resilient cups each of which is suited to the carrying of a single cherry and has a flexible perforated bottom portion through which the pit is expelled during the pitting operation.

It is an object of my present invention to provide an improved means for placing the cherries in their individual conveyor cups.

A further object is to provide means for insuring more accurate delivery of the fruit to the conveyor cups for delivery to the processing mechanism.

A still further object is the provision of improved means for preventing cherries from bouncing out of their resilient conveyor cups when deposited therein.

A further object is to provide an improved delivery means permitting the cherries to roll into their respective conveyor cups with negligible impact.

Another object is to provide a distributing drum in which cherries are prevented from being damaged by jamming.

Another object is to prevent the delivery of an excess quantity of cherries to the conveying means, and yet assure that the machine will operate at full capacity at all times.

A further object is to provide a distributing device wherein the number of moving parts is substantially reduced, and wherein simplicity and economy in construction are obtained.

Additional objects of my invention will become apparent from the following description of the same taken in conjunction with the accompanying drawings wherein:

Fig. 2 is an end elevational view of my invention.

Fig. 3 is a plan view looking down on the distributing apparatus of my invention.

Figure 1:
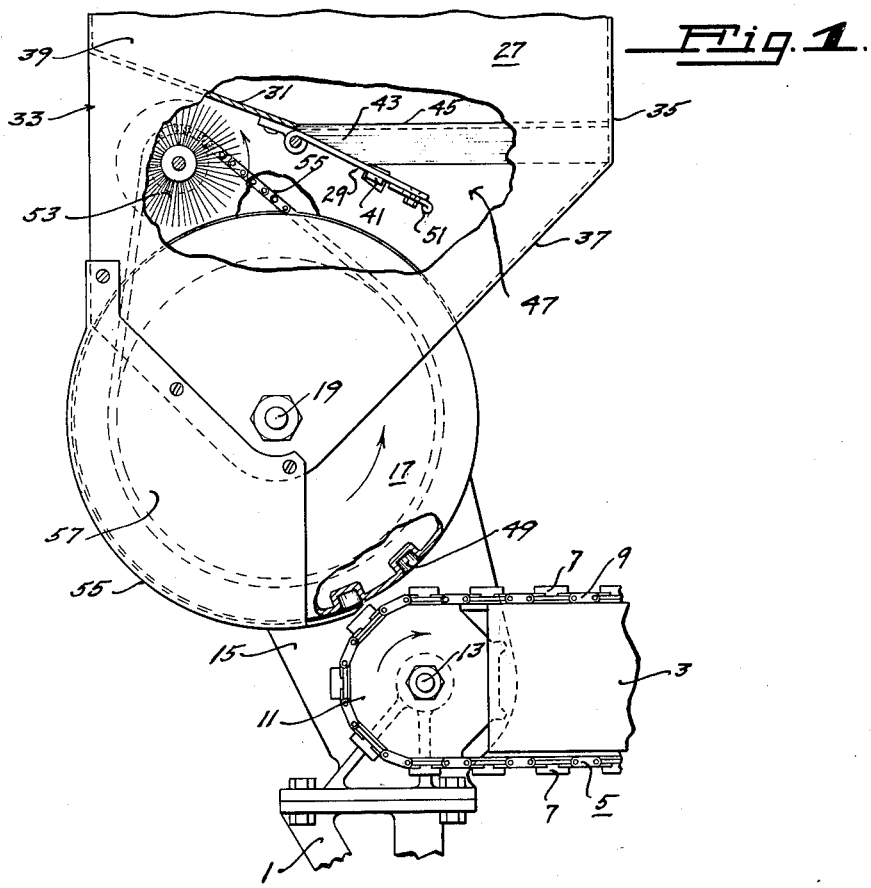
Fig. 1 is a side view, partially in section, of my improved distributing device.

Referring now to the drawings for a detailed description of the invention in its preferred form, a frame 1 is provided which acts as a support, not only for the distributing means but for the driving mechanism associated with one end of a conveyor table 3, which supports and guides a plurality of endless conveyor belts 5. The conveyor belts 5 have a plurality of resilient rubber cups 7 held in suitable mountings and connected by links 9. A driving sprocket 11 operates to propel the belts 5. This driving sprocket 11 rotates clockwise as viewed in Fig. 1 and is driven by a shaft 13 which is journaled in a housing 15 and extends out therefrom to either side so that a symmetrical layout may be employed with driving sprockets 11 and endless conveyor belts 5, on either side of the housing 15. The details of the gear mechanism contained within this housing and through which power is applied to the shaft 13, have been described in the Patent No. 2,169,353, referred to above and form no part of the instant invention.

The gear mechanism in the housing 15 serves also to drive a pair of distributing drums 17 mounted one on each end of a shaft 19 and at the same time said gear mechanism is instrumental in causing a shaft 21 to oscillate through a small arc so that by means of connecting links 23 and 25 a hinged portion of the floor of a hopper may be intermittently raised and lowered rapidly to maintain the fruit contents of the hopper in constant agitation. The hopper is here shown at 27 and in my improved form, the hopper bottom includes a pair of hinged portions 29 each of which is pivoted to the edge of a fixed downwardly sloping floor portion 31, extending the full width of the hopper and from its rear wall 33 to about half way between the rear wall 33 and the front wall 35 which includes an inwardly inclined section 37. Each of the hinged portions 29 is located adjacent a side wall 39 and capable of being vibrated by reason of an actuating means 41 connected to the terminals of links 25 and maintained in engagement with the undersurfaces of the hinged floor sections 29. Between the hinged sections 29 is a central ridged floor portion 43 having a longitudinal ridge line 45 midway of the two hinged portions 29 and at an elevation somewhat above the free ends of the sections 29.

A substantial opening 47 through the bottom of the hopper is thus provided at either side of the ridged mid-section 43, and due to the inclination of the floor section 31, the hinged sections 29 and the ridged mid-section 43, the contents of the hopper 27 will be substantially equally distributed and guided to these two openings 47 and in this, will be assisted by the constant vibration of the hinged sections 29.

Once having passed through either of these openings 47, the contents will be directed by the inwardly sloping portion 37 of the front wall 35 toward the distributor drums 17 which are rotatably supported beneath the hopper by the shaft 19 as previously stated. The drums 17 are similar, each comprising a hollow casting of bronze or similar material which is resistant to corrosion. Around the periphery of each drum, there are formed a plurality of fruit receiving stations in the form of uniformly spaced recesses or pockets 49, each of which is of a depth and cross-section sufficient to conveniently and loosely receive a cherry of normal size. These recesses 49 have their edges slightly rounded off at the surface of the drum 17 in which they exist, to prevent damage to the skin of the fruit in the handling of the same. The recesses 49 are symmetrically located about the circumference of each drum in rows equal in number to the number of endless conveyor chains 5 to be fed by such distributor drum, and the spacing between recesses or pockets 49 of each row could be made equal to that existing between the successive rubber conveyor cups 7 on an endless conveyor chain 5 but in the preferred form of my invention, are spaced a distance slightly greater than the distance between successive cups 7. Cherries are fed into the hopper 27 of the machine and are distributed by the sloping floor sections 29, 31 and 43 in approximately equal amounts through the openings 47 to the two drums 17, the vibratory movement of the hinged sections 29 preventing the fruit from clogging the hopper and thus assuring a continuous feed to the distributor drums. The drums are rotated counter-clockwise as viewed in Fig. 1 and such cherries as drop into the many recesses or pockets 49 in the drum surface are carried in the direction of rotation, subsequently to be discharged therefrom to the conveyor carrying cups 7.

To assure that each drum 17 will carry a full complement of cherries to its associated conveyor 5 at all times, I provide for a spacing between the free edge of each hinged section 29 and its associated drum 17 just sufficient to pass a single layer of cherries and such cherries are permitted to be carried for a limited distance by a drum, and then agitated so that their relative positions will be constantly changing. Thus any pocket or recess 49 which may have slipped by the first batch of cherries without receiving one therefrom, will have an opportunity to receive one subsequently, as that recess travels beneath that smaller batch of cherries which has been permitted to pass between the hinged section 29 and the drum 17.

Since different species and different grades of cherries vary as to average size, it becomes desirable to accommodate the distributing mechanism for such variations and for this purpose I provide adjustable extension 51 at the end of each hinged section 29 and affix it thereto by a slot and bolt connection. The presence of this extension enables one to exercise some control over the amount of cherries which will pass between such section 29 and drum 17.

The limited travel of such cherries and their subsequent agitation is controlled by a rotary brush 53 supported by shaft 54 adjacent to the upper surface of each drum 17 and driven by a chain 56, simultaneously with operation of its associated drum, but at a relatively higher rate of speed, there being a brush for each drum 17. The cherries carried against a brush 53 by the rotation of a drum 17 are driven backward and prevented from carrying through to the opposite side thereof. Hence, only those cherries pass a brush 53 which have become properly allocated in the recesses 49. An additional value in the use of a brush 53 is found in the fact that occasionally two cherries will become wedged into the same recess or pocket. I have found that such a brush will remove one of them from the recess or pocket without substantial damage to the fruit, and thereby permit only one cherry to carry through a machine in each pocket.

The rear wall 33 of the hopper has affixed thereto at its bottom edge a shield 55 for each drum. The shield is formed concentric with and spaced slightly from its drum 17 and is provided with side walls 57 to partially enclose the drum. This shield acts to retain the cherries in their respective pockets 49 against the pull of gravity. There is not, however, sufficient friction developed between the smooth interior surface of a shield 55 and the cherry to in any way damage the fruit. What slight friction does exist, however, operates to advantage in maintaining free contact between the cherry and the walls of the recess in which it is pocketed, thus enabling free discharge of the cherry therefrom at the proper time. Each shield 55 extends under its drum 17 to the position of discharge of the cherries from the recesses, and such discharge is arranged to start when the pockets in a drum 17 and the conveyor cups on the endless belts 5 associated therewith, approach sufficiently close to each other to preclude escape of the cherry as it rolls out of its drum recess 49 into the cooperating conveyor cup 7. To successfully negotiate such transfer, with the apparatus described, a peripheral row of drum recesses or pockets 49 must lie in the plane of its associated chain of conveyor cups 7 and the drum must be so positioned with respect to the chain of conveyor cups that during the transfer operation the space separation between any cup and cooperating recess is insufficient to permit escape of the cherry. Thus the recess and the cup at least partially enclose the cherry during the period of transfer, thus guiding and steadying the cherry during transfer and giving it an opportunity to accommodate itself to the conveyor cup before the recess or pocket, which has been functioning as a sort of cover, lifts away, and by this time the conveyor cup 7 will have approached a horizontal position. Consequently if there had been any tendency for any one cherry to bounce out of the conveyor cup, or if it had not centered itself properly in the conveyor cup initially, such factors cannot upset the efficiency of the transfer operation.

Furthermore, in making the transfer the cherry is permitted to roll from its drum recess to its conveying cup and the distance through which it must move to reach the conveyor cup has been reduced to a minimum by reason of the close spacing between pocket 49 and cup 7 at the point of transfer. Such distance through which each cherry must travel to reach the conveyor cup is not as great as its own diameter and hence is not afforded an opportunity to accelerate to the point where, due to the resilient nature of the cup, it might strike with sufficient impact to cause it to bounce out of the conveyor cup were no other safeguard provided.

In addition to the fact that the individual cherry is guarded against escape during transfer from a drum pocket or recess to a conveyor cup, and that the transfer distance is insufficient to enable disturbing acceleration of the cherry, the successful transfer of the fruit from the recesses 49 to the pockets 7 is further assured by reason of the fact that I have so correlated the postion and movement of the distributor drums 17 and their associated conveyors 5 as to bring about a substantial suspension of relative movement between such drum pocket 49 and conveyor cup 7 as may at any time be cooperating in the transfer of a cherry from the one to the other, and such suspension of relative movement is realized without in any way interfering with the continuous running of the distributor drums 17 and conveyor 5. It is to be noted in this connection that the drums 17 and conveyors 5 are so associated that transfer of cherries takes place while both the recess 49 and cooperating pocket 7 are each travelling along an arcuate path. Now, if the velocity of such recess and the cooperating pocket were made substantially the same, no appreciable relative movement would occur between the two for a few degrees of travel before and after they come into alinement along a common axis, and at the instant they would arrive in alinement, the relative movement between the two would be zero, in spite of the fact that each is moving at a substantial velocity. The velocity of the recess 49 and that of the cup 7 could be made the same either by making the drive sprocket 11 of the same diameter as the drum 17 and running them both at the same number of revolutions per minute, or if the drum 17 is to be of larger diameter as shown in the drawings, the gear ratio of gears in housing 15 can be determined accordingly, so that the velocity of the recesses 49 and the cups 7 will be practically the same.

This condition will exist where the spacing between sucessive recesses or pockets and that existing between successive cups is the same.

However, where the spacing between recesses is somewhat greater than the distance between cups, as happens to be the situation in the present case, the velocity of travel of the recesses must be increased accordingly in order to bring about alinement between successive recesses and successive cups on a common axis. In determining these relative velocities, due consideration should also be given to the fact that for smooth working and trouble free operation, the recesses or pockets will necessarily be of greater diameter than the cups since the cherries must be free to move into and out of the same, whereas the cups merely serve to seat the cherries and carry them to the pitting apparatus. Consequently as a recess or pocket approaches the position of alinement with a cup, the cherry in the recess or pocket which during this stage of its travel is being pushed ahead by the lowermost or trailing portion of the recess wall, will not be centered on the common axis of alinement when the recess and cup reach such relationship. Such lag on the part of the cherry can be compensated for by proper adjustment of the velocity at which the recesses or pockets are made to travel, thus to enable the cherry to catch up and roll out of its pocket onto the cup at the most suitable instant. The main factor to be considered, however, is to so design the apparatus that the velocities of the recesses 49 and the cups 7 will not differ appreciably and this is in large measure determined by the spacing between the recesses as compared to that between the cups.

The significance of such a relationship as has just been described wherein substantial suspension of relative movement between a recess and cooperating cup is realized, resides in the fact that during the transfer of a cherry from a recess or pocket 49 to a conveyor cup 7, there will exist little or no tendency to flip the cherry out of the cup while being deposited therein, it being apparent that were the velocity of the recess appreciably different from that of the cup, such result might occur.

Another factor of importance which has previously been touched on but not in detail, is the fact that the act of transfer occurs just prior to the time when the cup 7 receiving the cherry, establishes a horizontal position in its movement with the conveyor 5. Thus at the completion of the transfer operation, the position of the cherry will have become stabilized, as there will then be no component of gravity tending to dislodge it from its position in the cup. It has been found that if the common axis of alinement makes a thirty degree angle with the vertical, that the transfer operation will have been completed at just about the proper time to realize this advantage. The axis of alinement may be defined as the line determined by the axis of a pocket 49 and the axis of a cup 7 when they coincide at the point of discharge. This angle, however, is not so critical that beneficial results may not be obtained in spite of slight variations therein.

The mechanism thus described results in practically perfect delivery of the cherries to the conveying cups and I have found the number of cherries which are not properly delivered is negligible. It will thus be apparent that my present construction effectively enables the placing of small fruits on conveying means suitable for carrying such fruit to processing apparatus, and in the manner of its operation fulfills all the objects and purposes of my invention.

While the invention has been described in detail with respect to its preferred embodiment, it is no doubt capable of modification without departing from the spirit or scope of the invention, and further, the invention is adaptable for use in the distribution of various fruits or the like where a distribution of the same along the lines described is desired.

I claim:

1. Mechanism for distributing fruit or the like individually upon a conveyor comprising a supply source for receiving a substantial quantity of such fruit in bulk and having a discharge opening, an intermediary drum located adjacent said opening and having a plurality of individual fruit receiving means about its periphery, each fruit receiving means having an axis along a radius of said drum, said drum being rotatable with respect to said supply source to receive individual fruit from said quantity and carry the same through a substantial arc of rotation of said drum, at which point the fruit will be discharged from said drum, and a conveyor extending close to the periphery of said drum at the point of discharge with a spacing between said periphery and a fruit supporting surface portion of said conveyor as measured along the axis of a fruit receiving means at the point of discharge, substantially less than the size of said fruit, to enable said fruit receiving means to retain a control on the fruit until such fruit has settled on said conveyor.

2. In a fruit processing machine, a conveyor comprising a belt, a plurality of fruit carrying devices extending above the plane of said belt during the carrying period of said fruit carrying means, each capable of carrying a single fruit, means for transferring fruit from a supply source to said carrying devices comprising an intermediary rotatable distributor drum having a plurality of fruit receiving stations on its periphery each capable of receiving a single fruit from said supply source at one point of its movement and discharging it at another point of its movement, said distributor drum being positioned with respect to said conveyor to bring said individual fruit receiving stations into direct transfer relationship with said fruit carrying devices at the point of discharge and in sufficiently close proximity to said fruit carrying devices that the distance between the distributor drum surface and a fruit carrying device at the point of discharge is less than the size of a fruit to preclude complete discharge of the fruit from said fruit receiving station until after such fruit has settled upon said fruit carrying device.

3. In a fruit processing machine, a conveyor comprising a belt and including a plurality of fruit carrying means extending above the plane of said belt during the carrying period of said fruit carrying means, each capable of carrying a single fruit, means for transferring fruit from a supply source to said fruit carrying means of said conveyor comprising an intermediary movable distributor mechanism having a plurality of fruit receiving stations thereon each capable of receiving a single fruit from said supply source at one point of its movement and discharging it at another point of its movement, said distributor mechanism being positioned adjacent said conveyor at the point of discharge with each fruit receiving station extending about such fruit at the point of discharge and constituting with a fruit carrying means, a fruit confining enclosure at the point of discharge of substantially the same size as the fruit being carried.

4. In a fruit processing machine, an endless conveyor having in part, movement over an arcuate path followed by movement along substantially a horizontal path, said conveyor including a plurality of fruit carrying cups each capable of carrying a single fruit, means for transferring fruit from a supply source to said carrying cups comprising an intermediary distributor means having a plurality of fruit receiving stations on its periphery each capable of receiving a single fruit from said supply source at one point of its movement and discharging it at another point of its movement, said distributor means being positioned adjacent said conveyor with its discharge point opposite a point in the arcuate path of movement of said conveyor to bring each of said individual fruit receiving stations successively into alinement with one of said fruit carrying cups along a common axis making an angle of approximately 30 degrees with the vertical at the point of discharge to effect a direct and complete transfer of the contents of said fruit receiving stations to said fruit carrying cups substantially simultaneously with the arrival of said cups at the horizontal path of movement of said conveyor.

5. Means for distributing and positioning fruit or the like for processing the same, comprising a movable conveyor having a plurality of individual fruit carrying devices, a supply source for receiving a substantial quantity of such fruit or the like in bulk, distributor means for receiving fruit or the like from said bulk in units and depositing the same in said fruit carrying devices comprising movable mechanism having a plurality of fruit receiving stations each capable of receiving a single fruit from the contents of said supply source at one point of its movement and discharging the same at another point of its movement, and means correlating the relative positions and movements of said fruit receiving stations and said fruit carrying devices to successively bring said carrying devices into fruit transfer relationship with said stations at one point in their paths of movement, each fruit receiving station extending about such fruit when in such fruit transfer relationship and together with a fruit carrying device, constituting a fruit confining enclosure of substantially the size of a fruit being carried.

6. In apparatus for the distribution of items of substantially uniform size, an endless conveyor having movement along an arcuate path at at least one end followed by a linear movement, a distributor means for conveying an item to be distributed through an arcuate path and discharging the same at a location along its arcuate path, means for supporting said conveyor with an arcuate portion of its movement adjacent the arcuate path of movement of the distributor means at said location of discharge, with the surface portions of said conveyor which receive said items being spaced from said distributor means a distance less than the size of said items as such receiving surface portions of the conveyor arrive at said location of discharge during movement of the conveyor.

7. Mechanism for distributing fruit or the like upon a conveyor which comprises a supply source for receiving a quantity of such fruit in bulk, a plurality of individual fruit receiving means for receiving fruit from said supply source, means for moving said fruit receiving means through a desired path of movement, to a point of discharge for such fruit and a conveyor adjacent said path of movement substantially parallel to the tangent thereto at the point of discharge, with each fruit supporting portion of said conveyor spaced from a fruit receiving means a distance less than the size of such fruit to enable said fruit receiving means to extend about such fruit at the point of discharge and constitute with a fruit supporting portion of said conveyor, a fruit confining enclosure.

8. Mechanism for distributing fruit comprising a conveyor including a plurality of shallow cup-like fruit carrying devices each capable of supporting a single item of fruit; and means for depositing single items of fruit onto said shallow cup-like fruit carrying devices including a plurality of complementary fruit receiving pockets each capable of carrying an individual item of fruit to a discharge point on said conveyor, and means for causing each of said pockets to approach said conveyor substantially parallel to the tangent at the point of discharge and, each pocket at the point of discharge extending about such fruit and constituting with a shallow cup-like fruit carrying device, a fruit confining enclosure.

9. Mechanism for distributing fruit upon a conveyor which comprises a supply source for receiving a quantity of such fruit in bulk, a plurality of individual fruit receiving means for receiving fruit from said supply source, means for moving said fruit receiving means through a desired path of movement, to a point of discharge for such fruit and a conveyor approaching said path of movement substantially parallel to the tangent at the point of discharge and sufficiently close thereto that such fruit at the moment it has settled on said conveyor is still partially confined by the individual fruit receiving means from which it is being discharged.

10. Apparatus of the class described for conveying soft-skinned fruit comprising a movable distributor member working in a hopper and a movable carrier member, said members having complemental fruit carrying and confining receptacles, which are adapted to be brought in register during their movement to transfer fruit from the distributor to the carrier member, the front wall of one of said receptacles in one of said members in the direction of movement of the carrier and distributor members, substantially precisely aligning with the front wall of the corresponding receptacle in the other of said members in the initial registering movement of the receptacles of said members to transfer fruit from the distributor member to the carrier member, and from a contiguous barrier wall at the bight between the members inclining upwardly away from the direction of movement of the members and directing fruit away from said bight, said carrier fruit receiving receptacle at the same time extending in an inclined plane downwardly away from the direction of movement of the members and adapted to receive the fruit from the distributor receptacle gradually as the movement of the members progresses and without bruising the fruit.

11. In an apparatus as defined by claim 10, wherein the distributor member is in the form of a drum having a plurality of the fruit carrying and confining receptacles arranged about its periphery.

12. In an apparatus according to claim 10, wherein the carrier member moves in part along an arcuate path, followed by movement along a horizontal path, and wherein the registering receptacles during the fruit transfer operation align along a common axis making an angle of approximately 30° with the vertical at the point of fruit transfer.

ELLSWORTH W. CARROLL.

CERTIFICATE OF CORRECTION.

Patent No. 2,208,474. July 16, 1940.

ELLSWORTH W. CARROLL.

It is hereby certified that error appears in the printed specification of the above numbered patent requiring correction as follows: Page 5, second column, line 16, claim 10, for the word "from" read --form--; and that the said Letters Patent should be read with this correction therein that the same may conform to the record of the case in the Patent Office.

Signed and sealed this 19th day of November, A. D. 1940.

(Seal)

Henry Van Arsdale,
Acting Commissioner of Patents.